United States Patent
Reiner

(10) Patent No.: US 6,695,416 B1
(45) Date of Patent: Feb. 24, 2004

(54) SERVICE BRAKE AND RETARDER METHOD FOR CONTROLLING THE BRAKE SYSTEM OF A VEHICLE IN A MUTUALLY COORDINATED MANNER

(75) Inventor: Michael Reiner, Fellbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/358,422

(22) Filed: Jul. 22, 1999

(30) Foreign Application Priority Data

Jul. 22, 1998 (DE) .......................................... 198 32 875

(51) Int. Cl.$^7$ ................................................ B60T 8/86
(52) U.S. Cl. .............................. 303/125; 303/3; 303/15
(58) Field of Search ........................... 303/15, 16, 17, 303/3, 7, 9.61, 9.62, 9.69, 20, 22.1, 155, 152, 186, 187, 188, 125; 310/113

(56) References Cited

U.S. PATENT DOCUMENTS

| 4,480,728 A | * | 11/1984 | Bailey et al. ............... 303/3 X |
| 4,848,852 A | * | 7/1989 | Inoue et al. ................. 303/155 |
| 5,303,986 A | * | 4/1994 | VanDeMotter et al. ....... 303/15 |
| 5,400,251 A | * | 3/1995 | Ishiguro et al. ................ 303/3 |
| 5,460,434 A | * | 10/1995 | Micke et al. ............... 303/9.62 |
| 5,508,574 A | * | 4/1996 | Vlock ......................... 310/113 |
| 5,516,200 A | * | 5/1996 | Tezuka et al. .................. 303/7 |
| 5,618,084 A | * | 4/1997 | Reiner ............................ 303/3 |
| RE36,036 E | * | 1/1999 | Engle ............................ 303/3 |
| 6,062,658 A | * | 5/2000 | Stumpe et al. ............. 303/155 |
| 6,202,783 B1 | * | 3/2001 | Taylor et al. ............... 180/305 |

FOREIGN PATENT DOCUMENTS

| DE | 4207965 A1 | 9/1993 |
| DE | 19642344 A1 | 4/1997 |
| DE | 19604391 A1 | 8/1997 |
| DE | 198 22 859 | 5/1998 |
| EP | 0 689 978 | 1/1996 |
| EP | 831252 A2 * | 3/1998 |
| WO | WO 93/18949 | 9/1993 |

* cited by examiner

Primary Examiner—Jack Lavinder
Assistant Examiner—Melanie Torres
(74) Attorney, Agent, or Firm—Crowell & Moring LLP

(57) ABSTRACT

A method controls a vehicle brake system having a service brake and a retarder in a mutually coordinated manner. The retarder is activated during each braking operation and is controlled as a function of the driver's braking desire as well as of driving condition values, road condition values and operating conditions of the vehicle (integrated operation of the retarder).

13 Claims, 1 Drawing Sheet

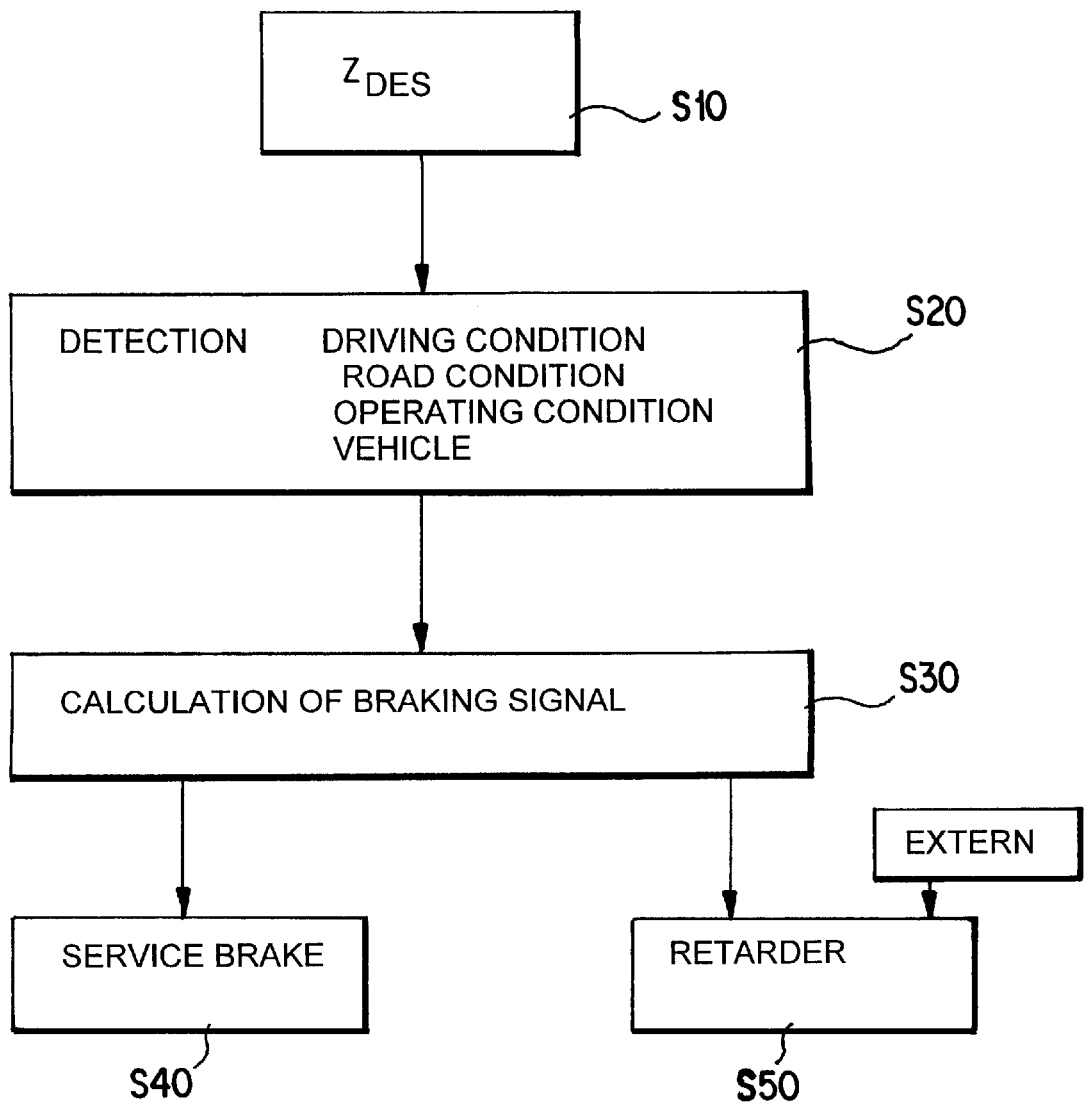

SERVICE BRAKE AND RETARDER METHOD FOR CONTROLLING THE BRAKE SYSTEM OF A VEHICLE IN A MUTUALLY COORDINATED MANNER

BACKGROUND OF THE INVENTION

This application claims the priority of 198 32 875.3-21, filed Jul. 22, 1998, the disclosure of which is expressly incorporated by reference herein.

The present invention relates to a process for controlling the brake system of a vehicle having a controllable service brake and a controllable retarder controlled in a mutually coordinated manner.

A known control method is disclosed, for example, in DE 196 04 391 A1. The fractions of the service brake and of the retarder are coordinated with one another so that, during adjustment of the service brake, the actual braking performance of the retarder is taken into account. In addition, operating parameters of the vehicle in the form of axle load signals, vehicle speed and the like are taken into account when determining the retarder and service brake fractions.

SUMMARY OF THE INVENTION

An object of the present invention is to further improve a vehicle brake system control method such that lower stress to components and longer brake lining service lives of the service brake are achieved while optimizing the braking effect of the vehicle.

In such a method for controlling the brake system of a vehicle, this has been achieved according to the invention by activating the retarder during each braking operation and automatically controlling the retarder as a function of the driver's braking desire, driving condition quantities, and/or road condition quantities of the vehicle (integrated operation of the retarder).

This integrated retarder operation achieves a reduction of the braking fraction of the service brake and leads to a lower stress to components and to longer brake lining service lives. Simultaneously control of the retarder as a function of driving condition values, road condition values and/or operating conditions of the vehicle achieves an optimal coordination of the braking effect of the service brake and the retarder with respect to one another. In particular, by the detection of the road condition values during braked and unbraked driving, adhesion conditions are also detected and taken into account when the retarder is operated and during the simultaneous operation of the service brake.

Advantageously, the service brake is activated first and then the retarder is activated. This particularly results in a fast response of the brake during a braking operation. In the case of very critical road conditions, a high adhesion requirement of the service brake alone already exists at an early stage so that retarder fractions are no longer permitted at all.

Furthermore, one advantageous currently contemplated embodiment provides that the retarder and the service brake are controlled such that the braking effect generated by the service brake does not fall below a defined fraction of the total braking effect during each braking operation. In a particularly advantageous manner, this prevents a glazing of the brake linings. This minimum fraction permits a spontaneous readjustment of fluctuating retarder effects, for example, during transmission shifting operations. Thereby, the driver's deceleration desire is always observed.

Furthermore, the retarder is preferably operated externally. The external operation by the driver always has priority over fractions of the integrated operation. The external operation is therefore generally considered as an additional braking desire.

It is particularly advantageous that the adhesion conditions are detected and the retarder fraction is coordinated with these conditions by the determination of the slip requirement of the retarder. As the result of this adhesion monitoring, the braking effect of the retarder as well as of the service brake is adapted to the road condition. Furthermore, the retarder fraction is advantageously adapted to the load condition of the vehicle.

In the method according to the present invention, advantageously no mechanical switch-off possibility of the integrated retarder is required. This also eliminates particularly switches, circuits and the like for switching off the retarder, and is particularly advantageous with respect to the manufacturing and particularly also with respect to the manufacturing costs.

BRIEF DESCRIPTION OF THE DRAWINGS

Other objects, advantages and novel features of the present invention will become apparent from the following detailed description of the invention when considered in conjunction with the accompanying drawings.

The sole FIGURE is a schematic view of a flow chart of a method using the present invention.

DETAILED DESCRIPTION OF THE DRAWINGS

In step S10, the driver's braking desire by way of the brake pedal $z_{des}$ is detected first. In addition to this detection of the driver's braking desire, in step S20, the driving condition, the road condition and the operating condition of the vehicle are detected. From these values, a braking signal is generated at step S30 for controlling the service brake and the retarder in steps S40 and S50 and emitted to the service brake and the retarder (integrated operation of the retarder).

In this particular embodiment, whether or not the retarder has already been externally operated is particularly monitored. If, at the start of the braking operation, the retarder has already been externally operated, the service brake will activate no further retarder fractions. In this case, no superimposition takes place of external and integrated retarder fractions. The braking by the service brake is understood to be a further braking desire by the driver in addition to the already effective retarder.

If, in contrast, during a braking with integrated retarder fractions, a separate operation of the retarder takes place, for example, by operating the cruise control switch or lever, the signal emitted to the retarder is replaced by a signal emitted to the service brake so that the additional braking desire by the driver can be implemented at all. If the separate retarder fraction leads to a high slip, which can be detected by way of conventional wheel sensors, the signal emitted to the retarder is also changed such that the retarder fraction is reduced.

In addition, the operation of the accelerator pedal is detected as an operating condition value of the vehicle. When the accelerator pedal and the brake pedal are operated simultaneously, the retarder fraction is reduced to zero. Also, additional operating condition values of the vehicle are monitored and are used for the determination of the retarder effect. If, for example, the vehicle engine fails, the retarder fractions are also reduced to zero because, for safety reasons, the brake system of a vehicle is conceived such that, in the event of an engine failure, a braking by the service brake must take place.

It is understood that, in addition, the vehicle speed and the axle load distribution, which lead to conclusions particularly with respect to the loading condition of the vehicle, and possibly other relevant driving condition and operating condition values can be detected and used for the determination of the retarder and service brake fractions. An axle load sensor or the like is superfluous for detecting the axle load distribution. From rotational engine and wheel speed signals, which are sensed in any event, for example, for implementing an antilock system, the total mass is determined by calculation. Information is obtained therefrom concerning the axle load fractions from the rotational wheel speed action during the braking with the service brake alone and, when starting in the case of an unbraked drive, by the driven axle which is therefore identical with the retarder-braked axle. The rotational wheel speed action when braking with the service brake as well as when braking with the retarder takes place by a learning operation.

The learning operation when braking with the service brake alone is disclosed, for example, in DE 38 29 951 C2, EP 357983 B1, DE 40 07 360 C2, and EP 445575 B1, all of which are incorporated by reference herein to the extent necessary.

The learning phase during the braking with the retarder takes place as early as during the start of the drive by way of the retarder-braked axle as follows. From the ratio of the slip requirement to the driving force on the rear axle, a force constant: $fk = \Delta ds/\Delta F_{HA}$ is calculated, wherein ds is calculated as follows from the front axle speed $V_{VA}$ and the rear axle speed $V_{HA}$:

$$ds = V_{VA} - V_{HA}/V_{VA}.$$

The driving/retarder braking force on the rear axle $F_{HA}$ is formed in the following manner described in DE 195 13 509 A1 and EP 737608 A2, also incorporated herein by reference, in which, however, for increasing the accuracy, the rotating masses of the engine and of the tires must be taken into account:

$$F_{HA} = u \cdot M_{eng} \cdot 1/= (u^2 \cdot J_{eng} V \cdot k + m_{tire}) \cdot Z_{actual} \quad [N]$$

with:

$$Z_{DBI} = -F_{HA}/m \quad [m/s^2]$$

wherein:

$M_{eng}$ [Nm] engine-side retarder braking moment
$J_{eng}$ [kgm$^2$] engine-side mass moment of inertia [−] drive train efficiency
u [1/m] transmission ratio and "conversion" M→F
$F_{HA}$ [N] driving/retarder braking force at HA
$m_{tire}$ [kg] mass of all wheels
$z_{actual}$ [m/s$^2$] vehicle deceleration (positive)
m [kg] vehicle mass.

Mass moments of inertia are used only in a simplified manner as average values for an entire vehicle series. For the tire fractions, a medium tire with R_dyn=500 mm is used as an example, in which, as a function of the calculated vehicle mass m[t] according to the formula $m_{tire} = 300 \times (1; m/15; 2)$ [kg], at least 6 tires (4×2) and maximally 12 tires (4×2 with a 3-axle trailer), and also tractor-trailer combinations are roughly taken into account. Drive-shaft-side fractions are not used. For the engine-side, transmission-ratio-dependent fractions, an average-mass moment of inertia is assumed which is adapted to the vehicle series. The transmission ratio or "conversion" of engine-side moments to braking forces at the wheel takes place, as known from the state of the art, when the mass is calculated with $u = 0.3777 \times n_{eng}/V_{HA}$ [1/m]. wherein:

$n_{eng}$ [l/min] rotational engine speed
0.377[−] resealing constant

Since the engine-side mass moments of inertia can be effective only when the clutch is closed, k=1 is set in this case. When the clutch is open or independently of the clutch signal, at $M_{eng}$<50 Nm, k=0 is set.

If fk is known, the desired driving force can be determined from the braking fraction of the retarder desired or derived during the braking by way of the relationship F=m·a, that is, $F_{HA} = m \cdot z_{DBI}$, by way of $ds = fk \cdot F_{HA}$, the slip required for this purpose can be predetermined. If, for example, an excessive slip requirement is determined, on the basis of an uncritical limit slip, the then maximally possible retarder braking fraction can be determined. When the vehicle mass is known, the braking fraction of the retarder $z_{DBI}$ can be determined as follows:

$$z_{DBI} = F_{HA}/m \quad [m/s^2],$$

wherein m is the vehicle mass in kg.

In this manner, the adhesion conditions have been detected by the predetermination of the slip requirement of the retarder-braked axle by way of values determined as early as at the start of the drive, and the retarder brake fraction is adapted to these by the predetermination of the slip requirement of the retarder. Thereafter, the integrated operation of the retarder can then take place provided that the detected adhesion conditions allow a conclusion that a vehicle is not critical. Thus, as a rule, in the case of empty vehicles with low rear axle load fractions, particularly in the case of semitrailer trains without cargo containers, in principle, no integrated operations of the retarder are carried out. This presents no problems because, in the case of empty vehicles, a reduction of the brake lining wear is not particularly important. Furthermore, the retarder braking fractions are also reduced to zero during a fast operation of the brake pedal which triggers a conventional brake power assist unit.

It is also particularly advantageous that, as the result of the monitoring and the detection of the adhesion conditions and the predetermination of the slip requirement of the retarder, a reduction of the retarder braking fractions or even a switching-off of the retarder can be implemented in critical driving conditions. A mechanical switch-off possibility by the driver, as customary in known brake systems, is therefore unnecessary and saves costs.

In an integrated retarder operation, the braking effect is continuously monitored and the signals for controlling the service brake and the signals for controlling the retarder are adapted to one another as a function of this detected braking effect. In this case, the adaptation takes place such that a certain overbraking of the retarder-braked rear axle is accepted because, for an optimal adhesion, i.e., there is no slip difference between the axles, too much braking work would have to be taken over by the front axle. A desired lining wear harmonization would not occur.

The limit for overbraking of the rear axle, which takes place in an integrated retarder operation, can be derived from control-back limits when the retarder is operated separately. During the integrated retarder operation of the retarder in this case, only a portion of the permissible slip is utilized which occurs when the retarder is operated separately. Thus, the retarder fraction is controlled in comparison to the service brake fraction such that an optimal braking effect occurs without the occurrence of adhesion-critical braking operations particularly on wintery roads. The retarder fraction may have to be reduced to zero if required by the road conditions.

It is understood that the integrated retarder operation takes place as a function of the steps of the retarder and coordinated with the operation of the service brake. Furthermore, the above-described method for controlling the brake system provides that, during each braking event, an operation of the service brake will always take place. During each braking event, the service brake is activated immediately and then the integrated retarder operation will take place only in a time-delayed manner. In addition, a minimum braking fraction of the service brake must always be ensured before an integrated operation of the retarder is defined. As a result, the risk of glazing the brake linings is avoided.

During a trailer operation of the vehicle, the fraction of the retarder can be subtracted in the described manner from the desired value of the braking operation. The "remainder" thus obtained applies in the same manner to the service brakes of tractor and trailer vehicles.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling a vehicle brake system having a controllable service brake and a controllable retarder, comprising the steps of controlling the service brake and the retarder in a mutually coordinated manner, activating the retarder during every braking operation, and controlling the retarder as a function of at least one of a driver's braking desire, driving condition values, road condition values, and vehicle operating conditions for integrated retarder operations wherein the retarder brake fraction is adapted to detected adhesion conditions that exist during accelerations by way of predetermined retarder slip requirement prior to the retarder activation to completely avoid critical operations.

2. The method according to claim 1, wherein the step of controlling the retarder and the service brake is such that a braking effect generated by the service brake does not fall below a defined fraction of total braking effect during each braking operation.

3. The method according to claim 1, wherein the step of controlling the retarder and the service brake is such that a braking effect generated by the service brake does not fall below a defined fraction of total braking effect during each braking operation.

4. The method according to claim 1, wherein the retarder braking fraction is adapted to a vehicle load condition.

5. The method according to claim 1, wherein a mechanical switch-off possibility of the integrated retarder operation is not required.

6. The method according to claim 5, wherein first the service brake is activated and only then the retarder is activated.

7. A method for controlling a vehicle brake system having a controllable service brake and a controllable retarder, comprising the steps of controlling the service brake and the retarder in a mutually coordinated manner, activating the retarder during every braking operation, and controlling the retarder as a function of at least one of a driver's braking desire, driving condition values, road condition values, and vehicle operating conditions for integrated retarder operations wherein the retarder brake fraction is adapted to detected adhesion conditions by way of predetermined retarder slip requirement prior to the retarder activation to completely avoid critical operations and the retarder is externally operable such that an external operation always has priority over the integrated retarder operation.

8. A method for controlling a vehicle brake system having a controllable service brake and a controllable retarder, comprising the steps of controlling the service brake and the retarder in a mutually coordinated manner, activating the retarder during each braking operation, and controlling the retarder as a function of at least one of a driver's braking desire, driving condition values, road condition values, and vehicle operating conditions for integrated retarder operations, wherein the step of controlling the retarder and the service brake is such that a braking effect generated by the service brake does not fall below a defined fraction of total braking effect during each braking operation.

9. A method for controlling a vehicle brake system having a controllable service brake and a controllable retarder, comprising the steps of controlling the service brake and the retarder in a mutually coordinated manner, activating the retarder during each braking operation, and controlling the retarder as a function of at least one of a driver's braking desire, driving condition values, road condition values, and vehicle operating conditions for integrated retarder operations, wherein the step of controlling the retarder and the service brake is such that a braking effect generated by the service brake does not fall below a defined fraction of total braking effect during each braking operation, wherein the retarder is externally operable such that an external operation always has priority over the integrated retarder operation.

10. The method according to claim 9, wherein adhesion conditions are detected and the retarder braking fraction is adapted to the adhesion condition by determining a retarder slip requirement.

11. The method according to claim 10, wherein the retarder braking fraction is adapted to a vehicle load condition.

12. A method for controlling a vehicle brake system having a controllable service brake and an externally operable retarder for integrated retarder operations, wherein during operation a driver's braking desire is determined, from the driver's braking desire, a braking signal for controlling the service brake and a braking signal for the retarder are generated, at a start of the braking it is monitored whether or not the retarder has already been externally operated, and if the retarder has already been activated at the start of the braking, no further retarder fractions will be activated.

13. A method for controlling a vehicle brake system having a controllable service brake and an externally operable retarder for integrated retarder operations, wherein during operation, a driver's braking desire is determined, from the driver's braking desire, a braking signal for controlling the service brake and a braking signal for the retarder are generated, at a start of the braking it is monitored whether or not the retarder has already been externally operated, and if, during determination of a driver's braking desire, a separate external operation of the retarder takes place, an additional driver's braking desire is implemented.

* * * * *